United States Patent Office 3,842,064
Patented Oct. 15, 1974

---

3,842,064
PSYCHOPHARMACOLOGICALLY ACTIVE TETRA-, PENTA-, HEXA-, AND HEPTA-PEPTIDES
Hendrik Marie Greven, Heesch, Netherlands, assignor to Akzona Incorporated, Asheville, N.C.
No Drawing. Filed Mar. 19, 1973, Ser. No. 342,338
Claims priority, application Netherlands, Mar. 31, 1972, 7204422
Int. Cl. A61k 27/00; C07c 103/52
U.S. Cl. 260—112.5     5 Claims

ABSTRACT OF THE DISCLOSURE

The invention relates to psychopharmacologically active peptides with the formula:

A-L-Glu(X)-L-His-L-Phe-D-Lys(or D-Arg)-Y in which A represents H-L-Met, H-D-Met, H-L-Met-($\rightarrow$O), H-D-Met($\rightarrow$O), H-L-Met($\rightarrow$O$_2$), H-D-Met ($\rightarrow$O$_2$), desamino-Met, desamino-Met($\rightarrow$O), desamino-Met($\rightarrow$O$_2$) or the moiety H$_2$N—B—CO—, in which B is a branched or unbranched alkylene group with 1–6 carbon atoms,
X represents the group —OH or —NH$_2$ and
Y represents the group: hydroxy, -L-Trp-OH, -L-Phe-OH, -L-Trp-Gly-OH, -L-Phe-Gly-OH, a (N-phenylalkyl) amino group of the formula:

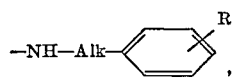

or a (N-$\beta$-indolylalkyl)amino group, in which Alk means a branched or unbranched alkylene group with 1–6 carbon atoms and R hydrogen, halogen, hydroxy, a lower alkyl or alkoxy group (1–4 C), as well as to functional derivatives of these peptides.

The above peptides and peptide derivatives inhibit the extinction of conditioned avoidance response, that means that they can be used, in general, as antidepressants. More particularly they can be used for the treatment of mental disorders, whereby a stimulation of the mental performance is desired.

---

The invention relates to peptides and peptide derivatives with highly active psychopharmacological properties.

From European Journal of Pharmacology 2, 14 (1967) certain peptide fragments of the natural adrenocorticotrophic hormones (ACTH) are known to inhibit the extinction of the conditioned avoidance response. Especially the peptide having the amino acid sequence 1–10 of ACTH proved to be active in this respect. Moreover it was found that the first three amino acids (Ser-Tyr-Ser) could even entirely be omitted without much loss of activity. The article ends with the conclusion that the peptide with the amino acid sequence 4–10 of ACTH, viz H-Met-Glu-His-Phe-Arg-Trp-Gly-OH, is the shortest peptide, and perhaps the key sequence for the said acivity. The peptide with the amino acid sequence 4–10 of ACTH does not only exert the psychopharmacological property mentioned above, but also, a slight MSH activity, as usual in this type of ACTH fragments. Although the effect of a low dose administration of a MSH active peptide in men is still unknown, a search was done for peptides having at least the same psychopharmacological activity but no or a reduced MSH-activity.

In our co-pending Netherlands patent application 72.02.278 and corresponding copending U.S. application Ser. No. 331,945, filed Feb. 12, 1973 it is already disclosed that the N-terminal amino acid L-Met of the original 4–10 ACTH peptide can be replaced without any loss of activity by D-Met, L- or D-Met($\rightarrow$O), L- or D-Met($\rightarrow$O$_2$), desamino-Met, desamino-Met($\rightarrow$O), desamino-Met($\rightarrow$O$_2$), or the group: H$_2$N—B—CO—, in which B represents: a branched or unbranched alkylene group with 1–6 carbon atoms, such as glycyl, valyl, alanyl, $\beta$-alanyl or $\alpha$-methylalanyl.

Furthermore the co-pending Netherlands patent application 72.03.042 describes that a replacement of the C-terminal peptide radical -L-Trp-Gly-OH of the original 4–10 ACTH peptide by a group selected from L-Phe-OH, L-Phe-Gly-OH and the group

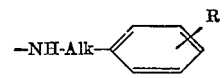

(N-phenylalkylamino-moiety) causes a considerable in-increase of the psychopharmacological activity.

Surprisingly it has now been found that a further increase of the psychopharamacological activity is obtained by replacing the amino acid L-Arginine or L-Lysine of the original 4–10 ACTH peptide or of any of the modified peptides described in the Netherlands patent applications mentioned before, with the corresponding D-amino acid.

The invention therefore comprises the manufacture and application of peptides and peptide derivatives of the general formula:

A-L-Glu(X)-L-His-L-Phe-D-Arg(or D-Lys)-Y    I in which A represents : H-L-Met, H-D-Met, H-L-Met-($\rightarrow$O), H-D-Met($\rightarrow$O), H-L-Met($\rightarrow$O$_2$), H-D-Met-($\rightarrow$O$_2$), Desamino-Met, Desamino-Met($\rightarrow$O), Desamino-Met($\rightarrow$O$_2$) or the group H$_2$N—B—CO—, in which B represents a branched or unbranched alkylene group with 1–6 carbon atoms,
Y represents: a hydroxyl group, the group L-Trp-OH, L-Phe-OH, L-Trp-Gly-OH, L-Phe-Gly-OH, a (N-phenylalkyl) amino group of the formula:

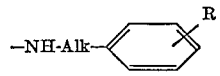

(in which Alk is a branched or unbranched alkylene group with 1–6 carbon atoms, and R hydrogen, halogen, hydroxy, or a lower alkyl or alkoxy group) or a (N-$\beta$-indolylalkylamino group, the alkyl group of which contains 1–6 carbon atoms, and
X represents: a hydroxy or amino group, as well as the functional derivatives thereof.

By replacing the amino acid radical L-Arg or L-Lys of the original 4–10 ACTH peptide with the corresponding D-Arg or D-Lys-amino acid radical the psychopharmacological activity observed generally rises by a factor 10.

This modification (L-Lys or L-Arg into D-Lys or D-Arg) incorporated into the peptides disclosed in the aforesaid Dutch co-pending patent applications causes a further increase of activity.

Special preference is given to peptides according to the general formula I, in which Y represents L-Phe-OH, L-Phe-Gly-OH, a (N-$\beta$-indolylalkyl)amino or (N-phenylalkyl)amino group as defined before, and A may have the aforesaid meaningss, but should preferably represent L-Met, L-Met($\rightarrow$O), L-Met($\rightarrow$O$_2$), desamino-Met, desamino-Met($\rightarrow$O), desamino-Met($\rightarrow$O$_2$) or $\beta$-Ala.

Especially the following peptides were found to have a very high psychopharmacological activity:

H-L-Met-L-Glu-L-His-L-Phe-D-Arg (or D-Lys)-L-Phe-OH, and the corresponding sulfoxide or sulfone,
H-L-Met-L-Glu-L-His-L-Phe-D-Arg (or D-Lys)-L-Phe-Gly-OH, and the corresponding sulfoxide or sulfone,
H-L-Met-L-Glu-L-His-L-Phe-D-Arg( or D-Lys)-Tra (Tra=tryptamide), and the sulfoxide or sulfone, desamino-Met-L-Glu-L-His-L-Phe-D-Arg(or D-Lys)-L-Phe-OH, or the corresponding sulfoxide or sulfone,
H-β-Ala-L-Glu-L-His-L-Phe-D-Arg(or D-Lys)L-Phe-Oh,
desamino-Met-L-Glu-L-His-L-Phe-D-Lys(or D-arg)-Tra or the corresponding sulfoxide or sulfone.

From synthetic chemical considerations the D-Lys peptides according to the present invention are preferred over the corresponding D-Arg peptides. Generally the lysine-containing peptides are easier to synthesize than the arginine-containing peptides.

The peptides and peptide derivatives according to the invention are prepared by a process commonly used in peptide-chemistry. The processes that are employed usually for the manufacture of the present compounds can be summarized as follows:

(a) condensation of a compound (amino acid, peptide) having a free carboxyl group and protected other reactive groups, with a compound (amino acid, peptide or amine) having a free amino group and protected other reactive group, in the presence of a condensation agent;

(b) condensation of a compound (amino acid, peptide) having an activated carboxyl group and optionally protected other reactive groups, with a compound (amino acid, peptide, amine) having a free $NH_2$ group and optionally protected other reactive groups;

(c) condensation of a compound (amino acid, peptide) having a free carboxyl group and optionally protected other reactive groups, with a compound (amino cid, peptide, amine) having an activated amino group and optionally protected other reactive groups, after which the protecting groups are removed, if necessary.

Activation of the carboxyl group can be effected, for example, by converting the carboxyl group into an acid halide, an azide, anhydride, imidazolide, or an activated ester such as the N-hydroxy-succinimido ester, or the p-nitro-phenyl ester.

The amino group can be activated by converting it into a phosphite amide or by the "phosphor-azo" method.

Methods usually employed for the above condensation reactions are: the carbodiimide method, the azide method, the mixed anhydride method and the method of the activated esters as described in "The Peptides," vol. I, 1965 (Acad. Press), by E. Schröder and K. Lübke. Moreover Merrifields's so-called Solid Phase Method, described in J. Am. Chem. Soc. 85, 2149 (1963), can be applied for the manufacture of the present peptides and peptide derivatives.

The reactive groups that are not allowed to participate in the condensation reaction are protected effectively by the so-called protecting groups, which can be easily removed again, for example, by hydrolysis or reduction. Thus, for example, a carboxyl group can be protected effectively by esterification with methanol, ethanol, tertiary butanol, benzylalcohol or p-nitrobenzylalcohol, or by conversion into an amide. This latter protecting group is very hard to remove, however, so that it is recommendable to use this group only to protect the carboxyl group of the C-terminal amino acid in the ultimate peptide or the γ-carboxyl group of glutamic acid. In this case the peptide synthesis leads direct to the amide of a peptide according to formula I.

Groups that are capable of protecting an amino group effectively are usually acid groups, for example an acid group derived from an aliphatic, aromatic, araliphatic or heterocyclic carboxylic acid such as acetic acid, benzoic acid, or pyridine-carboxylic acid, or an acid group derived from carbonic acid such as the group ethoxy-carbonyl, benzyloxy-carbonyl, t-butyloxy-carbonyl or p-methyloxy-benzyloxy-carbonyl, or an acid group derived from a sulfonic acid, such as the group benzene-sulfonyl or p-toluene-sulfonyl, but also other groups can be employed, such as substituted or unsubstituted aryl or aralkyl groups, for example benzyl and triphenylmethyl, or groups such as ortho-nitro-phenyl-sulfenyl and 2-benzoyl-1-methylvinyl.

It is mostly recommendable also to protect the guanidine group of arginine, the ε-amino group of lysine, and the imidazole group of histidine, but this protection is not absolutely necessary. Conventonal protecting groups in this connection are a tertiary butyloxy-carbonyl, or a tosyl group for the ε-amino group of lysine, a nitro group for the guanidine grgoup of arginine, and a benzyl, dinitrophenyl or a trityl group for the imidazole group of histidine.

The protecting groups can be split off by various conventional methods, depending upon the nature of the group in question, for example with trifluoro acetic acid, or by mild reduction, for example with hydrogen and a catalyst, such as palladium, or with HBr in glacial acetic acid.

Peptides according to the present invention having as the N-terminal moiety a methionylsulfoxide or desamino-methionylsulfoxide group, may be prepared from the corresponding Met- or Desamino-Met peptide by means of a mild oxidation known per se, for example with dilute hydrogenperoxide or a peracid. Such an oxidation yields a mixture of the S- and R-sulfoxide (=d- or l-sulfoxide), which mixture may be separated into the separate diastereomeric compounds in a conventional manner.

By coupling the S- or R-sulfoxide (=d- or l-sulfoxide) of methionine or desaminomethionine with the peptide H-Glu(X)-His-Phe-D-Arg(or D-Lys)-Y, in which X and Y have the meanings indicated above, the separate enantiomers can also be obtained in a direct way.

The peptides according to the invention having as the N-terminal residue a methionylsulfone (Met→$O_2$) or desaminomethionylsulfone (desamino-Met→$O_2$) group may be prepared most conveniently by an oxidation known per se of the corresponding Met- or Desamino-Met peptide, for example with $H_2O_2$ or a peracid.

By functional derivatives of the peptides and peptide-derivatives according to the invention are meant:

1. the pharmaceutically acceptable acid addition salts of the peptides and peptide derivatives,
2. peptides or peptide derivatives in which one or more free amino groups have been substituted by an acyl group derived from an aliphatic carboxylic acid with 1–6 carbon atoms, such as an acetyl group,
3. unsubstituted amides or lower alkyl (1–6 C) substituted amides of those peptides and peptide derivatives according to the invention having a free carboxyl group, such as $N(CH_3)_2$ or $N(C_2H_5)_2$ group,
4. esters of the present peptides derived from aliphatic or araliphatic alcohols with 1–18 carbon atoms; in particular, the lower aliphatic (1–6 C) alcohols, such as methanol, ethanol, butanol, pentanol or cyclohexanol, and the lower araliphatic (7–10 C.) alcohols, such as benzylalcohol, phenylethylalcohol, phenylpropylalcohol, or cinnamylalcohol,
5. metal complexes formed by contacting the peptides of peptide derivatives with a sparingly soluble salt, hydroxide or oxide of a metal, preferably zinc, or preparations obtained by associating the present peptides with argonic, mostly polymeric, compounds, such as gelatine, polyphloretinphosphate or polyglutamic acid, to obtain a prolonged mode of action.

The acid addition salts are obtained by reacting the present compounds with a pharmaceutically acceptable organic or inorganic acid, such as HCl, phosphoric acid, acetic acid, maleic acid, tartaric acid or citric acid.

As already briefly said the present peptides and peptide derivatives as well as their functional derivatives defined above have valuable psychopharmacological activities. The present compounds inhibit the extinction of conditioned avoidance response, that means that they can be used, in general, as antidepressant agents. More particularly they can be used for the treatment of certain mental disorders whereby a stimulation of the mental performance is desired, such as in certain types of neurosis and in old-age infirmities (senility).

The compounds according to the invention can be administered parenterally, orally, sublingually, rectally or intranasally. Preferably, the peptides are placed in a form suitable for parenteral administration, for which purpose they are dissolved, suspended or emulsified in a suitable liquid. However, mixed with suitable auxiliaries and/or fillers the peptides may also be placed in a form suitable for oral, sublingual, rectal or intranasal administration.

The peptides or peptide derivatives according to the invention are preferably administered parenterally in a daily dosage of from 0.01 µg to 50 µg per kg. bodyweight, dependent upon the peptide's activity level. For oral, sublingual, rectal or intranasal administration the daily dosage may be considerably higher, preferably from 0.1 mg. to 50 mg. per kg. body weight.

Exceedingly valuable preparations are obtained if the present peptides are placed in a form in which they have a prolonged activity, for example, incorporated into gelatin, polyphloretinphosphate or polyglutamic acid, or preferably as metal complexes. These metal complexes can be obtained by contacting the peptides with sparingly soluble metal salts, metal hydroxides or metal oxides. As sparingly soluble metal salts the metal phosphates, metal pyrophosphates and metal polyphosphates are commonly used.

Metals that can be used in this process are the metals belonging to the b-groups of the periodic system, for example cobalt, nickel, copper, iron, and preferably zinc, as well as the metals belonging to the main groups of the periodic system and capable of forming complexes, such as magnesium and aluminium. The preparation of the said metal complexes takes place in the conventional manner.

Thus, for example, a metal complex can be obtained by adding the peptide and a poorly soluble metal salt, metal hydroxide or metal oxide to an aqueous medium. The metal complex can also be obtained by adding an alkaline medium to an aqueous solution of the peptide and an insoluble metal salt to form the insoluble peptide/metal hydroxide complex.

Moreover, the metal complex can be obtained by adding the peptide, a soluble metal salt and a soluble salt to an aqueous, preferably alkaline medium to form an insoluble peptide/metal salt complex in situ.

The metal complexes can be employed at once as suspensions, or for example be lyophilized and afterwards suspended again.

BIOLOGICAL ACTIVITY

Extinction of the conditioned avoidance response

Male white rats weighing approximately 150 grams were conditioned by means of the so-called pole-jumping test. The conditioned stimulus was a light presented over the cage for 5 seconds, whereupon the unconditioned stimulus of shock was delivered through the grid floor of the cage.

For 3 consecutive days 10 tests were run every day with an average interval of 60 seconds. The day after this acquisition period the extinction was studied in sessions of 10 trials. All animals that made 8 or more positive responses in the first extinction session were treated with the substance to be tested or with a placebo. After that, extinction sessions of 10 trials each were carried out 2 and 4 hours after the treatment of the animals with the substance to be tested.

In the following table the results of the known peptide 4–10 ACTH are compared with some peptides according to this invention.

| Peptide* | Dosage in µgm. per animal, s.c. | First session 0 hour | Second session after 2 hours | Third session after 4 hours | Potency ratio compared with 4–10 ACTH |
|---|---|---|---|---|---|
| H-Met-Glu-His-Phe-Arg-Trp-Gly-OH (4–10 ACTH) | 100<br>30<br>10 | 8<br>9<br>9 | 8<br>7<br>6 | 7<br>5<br>3 | <br><br>1 |
| H-Met-Glu-His-Phe-D-Lys-OH | 10<br>3 | 9<br>9 | 8<br>7 | 6<br>4 | <br>>3 |
| H-Met-Glu-His-Phe-D-Arg-OH | 10<br>3 | 9<br>9 | 7<br>6 | 6<br>4 | <br>>3 |
| H-Met-Glu-His-Phe-D-Lys-Trp-OH | 10<br>3 | 10<br>9 | 9<br>7 | 9<br>7 | <br>>10 |
| H-Met-Glu-His-Phe-D-Lys-Phe-OH | 0.3<br>0.1 | 8<br>9 | 8<br>8 | 9<br>5 | <br>300 |
| H-Met-Glu-His-Phe-D-Lys-Tra | 0.3<br>0.1 | 9<br>9 | 9<br>8 | 8<br>7 | <br>500 |
| H-Met-Glu-His-Phe-D-Lys-Phe-Gly-OH | 0.3<br>0.1 | 9<br>9 | 8<br>8 | 8<br>4 | <br>300 |
| H-Met(→O)-Glu-His-Phe-D-Lys-Phe-OH | 0.03<br>0.01 | 9<br>9 | 8<br>7 | 8<br>5 | <br>>1000 |
| H-β-Ala-Glu-His-Phe-D-Lys-Phe-OH | 0.3<br>0.1 | 8<br>9 | 9<br>8 | 8<br>7 | <br>500 |
| H-Met-Glu-His-Phe-D-Lys-L-Amf | 1<br>0.3 | 9<br>9 | 9<br>8 | 7<br>4 | <br>100 |
| H-Met(→O$_2$)-Glu-His-Phe-D-Lys-Phe-OH | 0.1<br>0.03 | 10<br>9 | 9<br>7 | 7<br>5 | <br>1000 |
| Desamino-Met-Glu-His-Phe-D-Lys-Phe-OH | 0.1<br>0.03<br>0.01 | 8<br>10<br>9 | 8<br>10<br>6 | 8<br>7<br>2 | <br><br>1000 |
| Desamino-Met(→O$_2$)-Glu-His-Phe-D-Lys-Phe-OH | 0.03<br>0.01<br>0.003 | 9<br>9<br>8 | 9<br>7<br>6 | 8<br>5<br>3 | <br><br>>1000 |

*If no optical configuration is given, the L-form is meant.

With regard to the various abbreviations used throughout the specification and examples, the following remarks are made:

(I) If no optical configuration has been stated the L-form is meant.
(II) The following abbreviations have been used for the protecting or activating groups:

Z=benzyloxy-carbonyl
Boc=tertiary butyloxy-carbonyl
tBu=tertiary butyl
Me=methyl
ONP=p-nitrophenyloxy
Su=succinimido (III) For the solvents or reagents the following abbreviations have been used Bz=benzene
To=toluene
EtOH=ethanol
Bu=butanol
Py=pyridine
Ac or HAc=acetic acid
Fo=formic acid
Am=amyl alcohol
iPro=isopropanol
DMF=dimethylformamide
THF=tetrahydrofuran
DCCI=dicyclohexyl-carbodiimide
DCHU=dicyclohexyl-ureum
TAA=triethylamine
TFA=trifluoro acetic acid
Wa=water IV For the amino acid the following abbreviations have been used Met=methionyl
Met($\rightarrow$O)=methionylsulfoxide (rac.)
Met(d,$\rightarrow$O)=methionyl(d)sulfoxide
Met(l,$\rightarrow$O)=methionyl(l)sulfoxide
Met($\rightarrow$O$_2$)=methionylsulfone
Glu(X) or Glu=glutamyl (X=OH)
Glu(X) or Gln=glutaminyl (X=NH$_2$)
His=histidyl
Phe=phenylalanyl
Arg=arginyl
Lys=lysyl
Gly=glycyl
Val=valyl
Ala=alanyl
β-Ala=β-alanyl
(α-Me)Ala=α-methylalanyl V Abbreviations used for other residues Amf=(N-1-phenylisopropyl)amino group (derived from amfetamine)
Tra=(N-β-indolylethyl)amino group (derived from tryptamine)
PEA=(N-phenylethyl)amino group
PPA=(N-phenylpropyl)amino group
HPEA=(N-p.hydroxy-phenylethyl)amino group
Desamino-Met=desamino-methionyl (or γ-methylthiobutyryl)
Desamino-Met($\rightarrow$O)=desamino-methionyl sulfoxide
Desamino-Met($\rightarrow$O$_2$)=desamino-methionyl sulfone.

*Preparation starting substances*

A. Preparation Boc-Met-Glu(OtBu)His-$_2$H$_3$ (1) Boc-Met-Glu(OtBu)-His-OMe

Boc-Met-N$_2$H$_3$ 10.52 g), dissolved in 75 ml. of DMF is cooled down to 0° C., after which 23.6 ml. of 3.4 N HCl in THF are added, and at —20° C. 5.85 ml. (43.3 mmol) of isoamyl nitrite. The mixture is stirred for 7 minutes at —20° C. and then added to a solution of 17.05 g. of H-Glu(OtBu)-His-OMe.2 HCl in 50 ml. of dimethylformamide, and enough triethylamine to adjust the final pH of the mixture to 6.9. The mixture is stirred for 3 days at 0° C. after which the triethyl amine.HCl formed is filtered off, and the filtrate evaporated to dryness. The residue is dissolved in 150 ml. of ethyl acetate layer washed twice with water. Then the water layers are combined and extracted again with ethyl acetate (twice with 25 ml.). The ethyl acetate layers are dried, after which the solution is evaporated to about 100 ml. and set aside at 0° C.

Melting point: 138–142° C.
Rƒ in Bu:Ac:Wn (4:1:1)=0.59 on SiO$_2$.

(2) Boc-Met-Glu(OtBu)-His-N$_2$H$_3$

Of the above methyl ester 3.7 g. are dissolved in 70 ml. of methanol, after which 3.7 ml. of hydrazine hydrate are added. The mixture is stirred for 5 hours at room temperature. The solution is evaporated to dryness and then stirred with water and dried.

Rƒ in Am:iPo:Wa (10:4:5)=0.39 on SiO.

B. Preparation Boc-D-Met-Glu(OtBu)-His-N$_2$H$_3$ (1) Boc-D-Met-Glu(OtBu)-His-OMe Boc-D-Met-N$_2$H$_3$ (10.52 g.), dissolved in 25 ml. of DMF, is cooled down to 0° C., after which 23.6 ml. of 3,4 N hydrochloric acid in THF are added, and at —20° C. 5.85 ml. of isomyl nitrite. The mixture is stirred for 7 minutes, after which 17.05 g. of H-Glu(OtBu)-His-OMe.2 HCl in DMF are added and the pH is adjusted to 6.9 with triethyl amine. The mixture is stirred for 3 days at 0°, after which it is filtered and the filtrate evaporated to dryness in vacuum. The residue is taken up in 150 ml. of ethyl acetate/water and washed with water. After being dried the organic phase is evaporated to 100 ml. and set aside at 0°.

The resulting crystals are dried.
Rƒ is Bu:Ac:Wa (4:1:1)=0.63 and SiO.

Melting point: 69–71° C.

(2) Boc-D-Met-Glu(OtBu)-His-N$_2$H$_3$

Of the above methyl ester 3.2 g. (5.45) mmol) are dissolved is 60 ml. of methanol, after which 3.7 ml. of hydramine hydrate are added. The mixture is stirred for 5 hours at room temperature, after which the methanol is distilled off in vacuum and the residue stirred with water. After being dried the hydrazides is immediately processed further.

Rƒ in Am:iPro:Wa (10:4:5)=0.37 (SiO$_2$).

C. Preparation Boc-Val-Glu(OtBu)-His-N$_2$H$_3$ (1) Boc-Val-Glu(OtBu)-His-OMe

Boc-Val-OH (3.26 g.; 15 mmol) is dissolved in 20 ml. of methylene chloride, after which 1.75 g. of N-hydroxy-succinimide are added. The mixture is cooled down to —20° C. after which 3.09 g. of DCCI, dissolved in 20 ml. of cooled methylene chloride, are added. The resulting solution is stirred for 1 hour at —20° C., and then for 20 hours at +20° C. After filtration of the resulting DCHU, the filtrate is evaporated in dryness and the residue dissolved in 30 ml. of DMF, after which 7.33 g. of Z-Glu(OtBu)-His-OMe (prepared according to Kappler Helv. 44, 1961) and 1.4 g. of 10% palladium on charcoal are added. Hydrogen is bubbled through the mixture for 5 hours, after which the mixture is stirred for 1 night, filtered and the filtrate evaporated to dryness. The residue is dissolved in aqueous ethyl acetate and washed with water, sodium bicarbonate and water. The organic phase is dried, after which the ethyl acetate is evaporated in vacuum. The residue is recrystallized from ethyl acetate/petroleum ether. Yield: 3.95 g. Melting point: 117–119° C.

$Rf$ in Bz:EtOH (8:2)=0.55 (SiO$_2$).

(2) Boc-Val-Glu(OtBu)-His-N$_2$H$_3$

Of the above methyl ester 5.75 g. are dissolved in 85 ml. of methanol, after which 3.72 ml. of hydrazine hydrate are added. The mixture is stirred for 7 hours at room temperature, after which the solution is evaporated to dryness and the residue triturated with ether.

$Rf$ in Am:iPro:Wa (10:4:5)=0.33 on SiO$_2$.

D. Preparation Boc-β-Ala-Glu(OtBu)-His-N$_2$H$_3$ (1) Boc-β-Ala-Glu(OtBu)-His-OMe Boc-β-Ala-OH (3.78 g.) is dissolved in methylene chloride. The solution is cooled down to 0° C., after which 2.3 g. of N-hydroxysuccinimide are added. The mixture is cooled down further to −22° C., after which 4.12 g. of DCCI are added. The mixture is stirred successively for 30 minutes at −22° C., for 3 hours at 0° C. and for 12 hours at room temperature. The precipitate formed (DCHU) is filtered of, the filtrate evaporated to dryness and the residue taken up in dimethylformamide. To this mixture are added 9.77 g. of Z-Glu(OtBu)-His-OMe and further 1.5 g. of palladium on charcoal as a catalyst. Then hydrogen gas is bubbled through the mixture for 6 hours after which the mixture is stirred for 12 hours. The catalyst is then filtered off and the filtrate evaporated to dryness. The residue is taken up in ethyl acetate and the solution washed successively with a sodium bicarbonate solution (5%) and water. The ethyl acetate phase is dried, after which the solution is evaporated to dryness and the residue recrystallised from ethyl acetate/petroleum ether (1:1).

Melting point: 93–95° C.
$Rf$ in Bz:EtOH (8:2)=0.25 on SiO$_2$.

(2) Boc-β-Ala-Glu(OtBu)-His-N$_2$H$_3$

The methyl ester obtained in (1) (3.0 g.) is dissolved in 60 ml. of methanol, after which 3 ml. of hydrazine hydrate are added. The mixture is stirred for 6.5 hours at room temperature, after which the solution is evaporated to dryness and the residue triturated with dry ether.

The substance was immediately used for further reactions.

$Rf$ in Am:iPro:Wa (10:4:5)=0.42 on SiO$_2$.

E. Preparation Boc-Gly-Glu(OtBu)-His-N$_2$H$_3$ (1) Boc-Gly-Glu(OtBu)-His-N$_2$H$_3$ In the same manner as described in C(1) Boc-Gly-Glu(OtBu)-His-OMe is prepared by reacting Boc-Gly-OH with H-Glu(OtBu)-His-OMe.

Melting point: 103–108° C.
$Rf$ in Bz:EeOH (8:2)=0.43 on SiO$_2$.

(2) Boc-Gly-Glu(OtBu)-His-N$_2$H$_3$

By reacting this substance with hydrazine hydrate as described in A.2 the Boc-Gly-Glu(OtBu)-His-N$_2$H$_3$ is prepared.

$Rf$ in Am:iPro:Wa (10:4:5)=0.32 on SiO$_2$.

F. In the same manner as described in C and D are prepared (1) Boc-Ala-Glu-(OtBu)-His-N$_2$H$_3$
$Rf$=0.33 (Am:iPro:Wa=10.4.5).
(2) Boc-(α-Me)Ala-Glu(OtBu)-His-N$_2$H$_3$
$Rf$=0.31 (Am:iPro:Wa=10:4:5).
(3) Desamino-Met-Glu(OtBu)-His-N$_2$H$_3$
$Rf$=0.52 (Bu:Ac:Wa=4:1:1).

G. Preparation of Boc-Met-Gln-His-N$_2$H$_3$

In the same manner as described in C.1) the amino acid derivative Boc-Met-OH is coupled to H-Gln-His-OMe, obtained from the corresponding Z-protected peptide (Helv. 44, 476, 1961) by hydrogenation with 10% palladium on charcoal, yielding the protected peptide ester: Boc-Met-Gln-His-OMe, which peptide is immediately processed into the corresponding hydrazide by the method described in C.2.

$Rf$ in Am:iPro:Wa (10:4:5)=0.28 on SiO$_2$.

H. Synthesis H-Phe-D-Arg-OH (1) Z-Phe-D-Arg(NO$_2$)-OMe

A solution of 12.8 g. of H-D-Arg(NO$_2$)-OMe.HCl in 200 ml. of DMF is cooled down to +5° C., after which 4.8 g. of TAA are added. The resulting triethyl amine.HCl is filtered off, after which 20 g. of Z-Phe-ONP are added. The mixture is stirred for 4 days at room temperature, whereupon part of the DMF is distilled off and the residue diluted with 400 ml. of ethyl acetate/water. The organic phase is washed with citric acid, ammonium hydroxide and water, and after that the ethyl acetate layer is dried and evaporated. After recrystallisation from ethyl acetate/petroleum ether the melting point is 89–93° C.

$Rf$ in Bz:EtOH (8:2)=0.62 (SiO$_2$).

(2) Z-Phe-D-Arg(NO$_2$)-OH

Of the above dipeptide 5 g. are dissolved in dioxane and then saponified with 1.1 equiv. sodium hydroxide. This solution is stirred for 2 hours and then acidified with 1 N hydrochloric acid (pH=2) and diluted with a tenfold quantity of water. The resulting precipitate is stirred for 3 hours at 0° and filtered off.

Yield: 3.1 g. Melting point: 118–121° C. (dec.).
$Rf$ in Bz:EtOH (8:2)=0.11 (SiO$_2$).

(3) H-Phe-D-Arg-OH.acetate

One gram of Z-Phe-D-Arg(NO$_2$)-OH of (2) is dissolved in 20 ml. of 90% acetic acid and after that 100 mg. of palladium 10% on charcoal are added. Hydrogen is bubbled through the mixture for 2 days and after that the black reaction mixture is filtered over hyflo, the filtrate evaporated to dryness and the residue dissolved in t-butanol/water (1:1) and lyophilized.

Yield: 0.4 g. of dipeptide acetate.
$Rf$ in Bu:Py:Ac:Wa (4:3/4:1/4:1)=0.21 (SiO$_2$).

(4) In the same way as described in (3) the Z-Phe-D-Arg-(NO$_2$)-OMe (of 1) is converted into the H-Phe-D-Arg-OMe.acetate.

$Rf$ in Bu:Py:Ac:Wa (4:3/4:1/4:1)=0.40 (SiO$_2$).

K. Synthesis H-Phe-D-Lys(Boc)-OH (1) Z-Phe-D-Lys(Boc)-OBzl

Starting from 17.7 g. of H-D-Lys(Boc)-OBzl.HCl the dipeptide Z-Phe-D-Lys(Boc)-OBzl is prepared in the same way as described in Example H(1).

Yield after crystallization from ethyl acetate ether: 72% (oil).
$Rf$ in Bz:EtOH (9:1)=0.54 (SiO$_2$).

(2) H-Phe-D-Lys(Boc)-OH

Two grams of Z-Phe-Lys(Boc)-OBzl are dissolved in 50 ml. of methanol, after which 0.2 g. of palladium 10% on charcoal is added and hydrogen is bubbled through the mixture for 5 hours. Then the mixture is filtered and the filtrate evaporated to dryness.

$Rf$ in Bu:Py:Ac:Wa (4:3/4:1/4:1)=0.31 ($SiO_2$).

L. Synthesis H-Phe-D-Lys(Boc)-Trp-OH and derivatives (1) Z-Phe-D-Lys(Boc)-Trp-OH Z-Phe-ONP (4.6 g.) is dissolved in 60 ml. of DMF. Then 4.4 g. of H-D-Lys(Boc)-Trp-OMe are added and the mixture is stirred for 20 hours at 20° C., after which 0.2 g. of 2-dimethylamino-ethylamine is added. The reaction mixture is stirred for another 2 hours, after which the solvent is evaporated and the residue dissolved in 250 ml. of ethylacetate/water. This solution is successively washed with a solution of 5% potassium carbonate in water, 0.5 N hydrochloric acid and water, after which the organic phase is dried on sodium sulphate. After filtration the filtrate is evaporated to dryness and the oily residue saponified. For this purpose 6.54 g. of the ester are dissolved in 100 ml. of dioxane, after which 11.8 ml. of 1.5 N NaOH are added. The mixture is stirred for 2 hours, after which the reaction mixture obtained is acidified with 1.5 N hydrochloric acid to pH 7, whereupon the dioxane is evaporated in vacuum. To the residue ethylacetate/water is added and the water layer is adjusted to pH 2 with dilute hydrochloric acid without separating the layers. The organic phase is washed with water and dried. Removal of the ethyl acetate by distillation in vacuum yielded an oil, which after stirring with ether became solid.

$Rf$ in Am:Py:Wa (5:3:2)=0.81 ($SiO_2$). M.p. 85° C. (dec.).

(2) H-Phe-D-Lys(Boc)-Trp-OH.HCl

Of the tripeptide acid of (1) 1.85 g. are dissolved in 40 ml. of DMF and 1 equiv. of hydrochloric acid. Then 350 mg. of palladium 10% on charcoal are added, after which hydrogen is bubbled through the mixture for 6 hours. After the reduction the catalyst is filtered off and the filtrate immediately processed further.

$Rf$ in Am:Py:Wa (5:3:2)=0.70 ($SiO_2$).

(3) Z-Phe-D-Lys(Boc)-Trp-$NH_2$ or Z-Phe-D-Lys(Boc)-Trp-N($CH_3$)$_2$

Two grams of the crude ester (obtained in the process described in (1) are added to 25 ml. of a 10 N ammonia solution or dimethylamine solution in methanol. The mixture is then stirred for 2 days, after which it is evaporated to dryness and the residue recrystallized from methanol.

$Rf$ in Bz:EtOH (8:2)=0.35 ($SiO_2$) for the amide and 0.41 for the dimethylamide.

(4) Z-Phe-D-Lys(Boc)-Trp-$OC_{11}H_{23}$

Z-Phe-D-Lys(Boc)-Trp-OH of (1) (3.6 g.) is dissolved in 45 ml. of DMF, after which 1.35 g. of undecyl bromide and 1.0 g. of dicyclohexyl amine are added. The mixture is stirred for 48 hours at 35° and for 2 hours at 0°, after which the dicyclohexyl ammonium bromide formed is filtered off and the filtrate evaporated to dryness in vacuum. The residue is taken up in ethyl acetate, washed with 0.1 N HCl, water, a 10% bicarbonate solution and water. The organic phase is dried for a short time on sodium sulphate, then partly evaporated in vacuum and crystallised by adding n-hexane. Yield: 3.2 g.

$Rf$ in Bz:EtOH (8:2)=0.45 ($SiO_2$).

(5) Removal of Z-group

In the same way as described in (2) one gram of the tripeptides prepared in (3) and (4) is hydrogenated with hydrogen in the presence of palladium on charcoal.

Obtained are the HCl salts of the following peptides:

1. H-Phe-D-Lys(Boc)-Trp-$NH_2$ $Rf^*$=0.73 on $SiO_2$
2. H-Phe-D-Lys(Boc)-Trp-N($CH_3$)$_2$ $Rf^*$=0.77 on $SiO_2$
3. H-Phe-D-Lys(Boc)-Trp-$OC_{11}H_{23}$ $Rf^*$=0.78 on $SiO_2$

*$Rf$ in Am:Py:Wa (5:3:2).

M. Synthesis of H-Phe-D-Lys(Boc)-Tra (1) Z-Phe-D-Lys(Boc)-Tra

Starting from Z-Phe-ONP and H-D-Lys(Boc)-Tra (oil: $Rf$ in Am:Fo:Wa (7:2:1)=0.70) the peptide Z-Phe-D-Lys(Boc)-Tra is prepared in the same way as described in Example 1(1).
Recrystallization from methanol-ether-petroleum-ether yielded after a few days a crystalline material.

Melting point: 158–162° C.
$Rf$ in BzEtOH (8:2)=0.73 ($SiO_2$).

(2) H-Phe-D-Lys(Boc)-Tra

Hydrogenation of the depeptide amide of (1) in methanol with palladium 10% on charcoal as a catalyst yielded H-Phe-D-Lys(Boc)-Tra. Yield 92%.

$Rf$ in Am:Py:Wa (5:3:2)=0.75 on $SiO_2$.
$Rf$ in Bu:Ac:Wa (4:1:1)=0.80 on $SiO_2$.

N. Synthesis of H-Phe-D-Arg-Tra (1) Z-Phe-D-Arg($NO_2$)-Tra

Z-Phe-ONP (2.1 g.) is dissolved in 20 ml. of DMF, after which this light yellow solution is cooled down to −5° C. Then a cooled solution of 1.81 g. of H-D-Arg($NO_2$)-Tra, obtained from Boc-D-Arg($NO_2$)-Tra (melting point 114° dec.) is added to this solution. The mixture is stirred for 20 hours at 0° and for 5 hours at room temperature. The reaction mixture is evaporated to dryness and the residue stirred three times with ether. The light yellow precipitate is crystallized a few times from ethanol-ether.

$Rf$ in Bz:EtOH (8:2)=0.41 on $SiO_2$.

(2) H-Phe-D-Arg-Tra.acetate

Of the above peptide 1.5 g. are dissolved in 200 ml. of 90% acetic acid and after that 150 mg. of palladium 10% on charcoal are added. Then hydrogen is bubbled through the mixture for 2 days, after which the reaction mixture is filtered over hyflo, the filtrate evaporated to dryness, the residue dissolved in t-butanol/water (1:1) and then lyophilized.

$Rf$ in Bu:Py:Ac:Wa (4:¾:¼:1)=0.26 on $SiO_2$.

O. Synthesis of H-Phe-D-Arg-Trp-Gly-OH.acetate (1) Boc-D-Arg($NO_2$)-Trp-Gly-OH

Boc-D-Arg($NO_2$)-OH (5.76 g.) are dissolved in 70 ml. of DMF and 2.52 ml. of TAA. This solution is cooled down to −10° C., after which 2.38 ml. of isobutyl chloroformate are added and the mixture is stirred for 10 minutes at −10° C. A solution of 4.7 g. of T-Trp-Gly-OH in 40 ml. of DMF and 2.0 ml. of triethyl amine is cooled down to −5° C. and added to the mixed anhydride, after which the final pH is adjusted with TAA to 7.2. The mixture is stirred for 2 hours at 0° and for 20 hours at room temperature, after which the precipitate is filtered off and the filtrate evaporated to dryness. Then the residue is dissolved in aqueous ethyl acetate. The organic phase is washed with citric acid, after that with saliferous water and then dried. After filtration a part of the thyl acetate is evaporated to a volume of about 100 ml., after which enough ether is added to cause a turbidity. The mixture is left to stand for some time, after which the precipitate obtained in this way is filtered off.

$Rf$ in Bz:EtOH (8:2)=0.65 on $SiO_2$ (2) H-D-Arg($NO_2$)-Trp-Gly-OH.HCl

Six grams of tripeptide are suspended in methylene chloride, after which dry hydrogen chloride gas is bubbled through for 50 minutes. After some time the HCl-salt of the tripeptide begin to precipitate. The mixture is filtered after 2 hours' stirring at 20° C. The residue is washed three times with dry ether and dried over solid potassium hydroxide.

$Rf$ in Am:Py:Wa (5:3:2)=0.54 on $SiO_2$.

(3) Starting from the tripeptide H-D-Arg($NO_2$)-Trp-Gly-OH.HCl

Described in (2) the tetrapeptide is prepared by condensation with Z-Phe-ONP in the manner described in Example N(1). Yield of Z-Phe-D-Arg($NO_2$)-Trp-Gly-OH: 64%.

$Rf$ in Bz:EtOH (8:2)=0.12 on $SiO_2$.

(4) H-Phe-D-Arg-Trp-Gly-OH.acetate

Of the peptide of (3) 1.5 g. are hydrogenated in the same way as described in Example N(2).

$Rf$ in Bu:Py:Ac:Wa (4¾:¼:1)=0.21 on $SiO_2$.

P. Synthesis of H-Phe-D-Lys(Boc)-Phe-OtBu (1) Z-D-Lys(Boc)-Phe-OtBu

Z-D-Lys(Boc)ONP (10.05 g.) are dissolved in 50 ml. of DMF. This solution is cooled down to —20° C., after which it is added to a solution of 4.1 g. of H-Phe-OtBu in 75 ml. of DMF. The mixture is stirred for 1 hour at 0° and for 20 hours at 20°, after which the reaction mixture is evaporated to dryness. The yellow residue is dissolved in ethyl acetate/water and washed with 5% potassium carbonate, water, 5% citric acid and water. The organic phase is dried and evaporated to dryness. The residue is dissolved in ethyl acetate, after which enough petroleum ether 40/60 is added to cause a turbidity. the resulting precipitate is filtered off.

$Rf$ in Bz:EtOH (9:1)=0.64 on $SiO_2$.

(2) H-D-Lys(Boc)-Phe-OtBu

Three grams of the dipeptide are dissolved in 60 ml. of methanol. Then palladium 10% on charcoal is added, after which hydrogen is bubbled through the mixture till no more $CO_2$ escapes (2 hours). After filtration the filtrate is evaporated to dryness to obtain a foam.

$Rf$ in To:EtOH (9:1)=0.21 on $SiO_2$.

(3) Z-Phe-D-Lys(Boc)-Phe-OtBu

Z-Phe-ONP (2.18 g.) is dissolved in 15 ml. of DMF. Then a solution of 2.24 g. of H-D-Lys(Boc)-Phe-OtBu of 2) in 30 ml. of DMF is added, after which the mixture is stirred at 20° C., for 15 hours. After evaporation of the yellow solution the residue is dissolved in 15 ml. of ethyl acetate, after which 50 ml. of petroleum ether are added. Then the mixture is left to stand for 3 hours at 0° C., after which the precipitate formed is filtered off. Melting point: 135–138° C.

$Rf$ in To:EtOH (8:2)=0.60 on $SiO_2$.

(4) H-Phe-D-Lys(Boc)-Phe-OtBu

Of the tripeptide obtained in (3) 2.5 g. are hydrogenated in the same way as described in (2).

$Rf$ in To:EtOH (8:2)=0.43 on $SiO_2$.

Q. Synthesis of H-Phe-D-Lys(Boc)-Phe-Gly-OtBu (1) Z-D-Lys(Boc)-Phe-Gly-OtBu

Z-D-Lys(Boc)-ONP (10.03 g.) is condensed with a solution of 5.1 g. of H-Phe-Gly-OtBu in 20 ml. of DMF in the same way as described in Example P(1) and then evaporated. The resulting residue is dissolved in ethyl acetate in the way described, washed and evaporated to dryness. The residue is immediately processed further.

$Rf$ in To:EtOH (9:1)=0.63 on $SiO_2$.

(2) H-D-Lys(Boc)-Phe-Gly-OtBu

Hydrogenation as described in Example P(2) yields the tripeptide as a foam in practically quantitative yield.

$Rf$ in To:EtOH (9:1)=0.24 on $SiO_2$.

(3) Z-Phe-D-Lys(Boc)-Phe-Gly-OtBu

Reaction of 2.18 g. of Z-Phe-ONP with 2.6 g. of H-D-Lys(Boc)-Phe-Gly-OtBu in 30 ml. of DMF for 24 hours in the way described in Example P(3), yields the tetrapeptide in 75% yield after crystallization from ethyl acetate-petroleum ether. Before the crystallization the ethyl acetate layer was washed with citric acid. Melting point: 78–80° C.

$Rf$ in To:EtOH (8:2)=0.85 on $SiO_2$.

(4) H-Phe-D-Lys(Boc)-Phe-Gly-OtBu

Hydrogenation of the tetrapeptide obtained in (3) in accordance with Example P(2) gives H-Phe-D-Lys(Boc)-Phe-Gly-OtBu as a foam.

$Rf$ in Bu:Py:Ac:Wa (4:¾:¼:1)=0.57 on $SiO_2$.

R. Synthesis of H-Phe-D-Lys(Boc)-(N-phenylalkyl)amide derivatives (1) Z-D-Lys(Boc)-PPA Z-D-Lys(Boc)-ONP (10.33 g.) is dissolved in 80 ml. of methylene chloride. The solution is cooled down to 0° C. after which 2.7 g. of 3-phenylpropylamine are added and the mixture is stirred for 30 minutes at 0° C. and for 20 hours at 20° C. The reaction mixture is evaporated to dryness and the residue taken up in ethyl acetate. The organic phase is successively washed with water, citric acid, water, 5% sodium bicarbonate and water, and then dried. After that the ethyl acetate is distilled off in vacuum.

The residue is recrystallized from ethyl acetate ether.

$Rf$ in Bz:EtOH (9:1)=0.53 on $SiO_2$.

(2) H-D-Lys(Boc)-PPA

Of the amide of (1) 8.75 g. are dissolved in 120 ml. of methanol, after which palladium 10% on charcoal is added. Then hydrogen is bubbled through the mixture for 4 hours, after which the mixture is filtered. The filtrate is then evaporated to dryness and the residue (oil) immediately processed further.

$Rf$ in Am:Fo:Wa (7:2:1)=0.58 on $SiO_2$.

(3) Z-Phe-D-Lys(Boc)-PPA

Of the amide (2) 6.39 g. are dissolved in 68.5 ml. of DMF, after which 7.61 g. of Z-Phe-ONP in 20 ml. DMF are added. The mixture is stirred for 20 hours at room temperature, after which the solvent is evaporated in vacuum. The residue is dissolved in 170 ml. ethylacetate and the ethylacetate phase is washed as described in 1) and dried. The residue is dissolved in the minimum quantity of ethylacetate and set aside at 0° C. After 3 days the precipitate is filtered off.

$Rf$ in Bz:EtOH (8:2)=0.72 ($SiO_2$).

(4) H-Phe-D-Lys(Boc)-PPA·HCl

Of the dipeptide-amide of (3) 9.07 g. are dissolved in 300 ml. of DMF, after which 4 ml. of 4 N HCl and 1.5 g. of palladium 10% on charcoal are added. Then hydrogen is bubbled through the mixture for 4 hours while stirring, after which the catalyst is filtered off and the filtrate evaporated to dryness. The remaining oil is stirred with ether.

Rƒ in Bu:Ac:Wa (4:1:1) = 0.65 (SiO₂).

(5) In the same way are prepared:

H-Phe-D-Lys(Boc)-Amf Rƒ¹ = 0.39 on SiO₂
H-Phe-D-Lys(Boc)-PEA Rƒ¹ = 0.34 on SiO₂
H-Phe-D-Lys(Boc)-HPEA Rƒ¹ = 0.29 on SiO₂

¹ Rƒ in To : EtOH (8 : 2).

EXAMPLE I

H-Met-Glu-His-Phe-D-Arg-OH and the corresponding methylester (1) Boc-Met-Glu(OtBu)-His-Phe-D-Arg-OH 1.17 g. of Boc-Met-Glu(OtBu)-His-N₂H₃ (A.2) are dissolved in 20 ml. of DMF. This solution is cooled down to 0°, after which 3 ml. of 2 N HCl/THF are added and then at −20° 0.27 ml. of isoamyl nitrite. The mixture is stirred for 7 minutes at −20° C., after which it is added to a solution of 0.76 g. of H-Phe-Arg-OH.acetate (H.3) after which the pH is adjusted to 7.2 with TAA. The mixture is stirred for 70 hours at 0° C., after which the DMF is distilled off in vacuum, whereupon the residue is taken up in aqueous ethyl acetate and washed three times with saliferous water. The ethyl acetate is distilled off and the residue recrystallized from dry ethyl acetate-petroleum ether.

Yield: 1.2 g. Rƒ in Bu:Py:Ac:Wa (2:3/4:1/4:1) = 0.56.

(2) Removal protecting groups

One gram of peptide is dissolved in 10 ml. of 90% trifluoro-acetic acid, after which the solution is stirred for 30 minutes. Then the reaction mixture is added dropwise to peroxide-free ether. The precipitate formed is filtered off and triturated with ether. The residue is dried over solid KOH. Then the substance is dissolved in 25 ml. of t-butanol/water after which Dowex X–8 in the acetate form is added to exchange the trifluoro acetate for the acetate (final pH 4–5). The ion exchanger is filtered off, after which the filtrate is lyophilized.

Rƒ in Bu:Py:Ac:Wa (2:3/4:1/4:1) = 0.18 (SiO₂).

(3) In the same way as described in 1. and 2. the peptide Boc-Met-Glu(OtBu)-His-N₂H₃ (A.2.) is coupled to H-Phe-D-Arg-OMe (H.4), resulting after removal of the protecting groups into H-Met-Glu-His-Phe-D-Arg-OMe.acetate.

Rƒ in Bu:Py:Ac:Wa (4:3/4:1/4:1) = 0.22 on SiO₂.

EXAMPLE II

H-Met-Glu-His-Phe-D-Lys-OH (1) Boc-Met-Glu(OtBu)-His-Phe-D-Lys(Boc)-OH 1.17 g. of Boc-Met-Glu(OtBu)-His-N₂H₃ (A.2) are dissolved in 20 ml. of DMF, after which at 0° 3 ml. of 2 N HCl in THF are added, and at −20° 0.27 ml. of isoamyl nitrite. The mixture is stirred for 7 minutes, after which it is added to a solution of 0.9 g. of H-Phe-D-Lys(Boc)-OH (K.2) in 10 ml. of DMF, whereupon the final pH is adjusted with TAA to 7.2. The mixture is stirred for 70 hours at 0°, after which the DMF is distilled off and the residue taken up in aqueous ethyl acetate. The organic phase is washed with saliferous water, thereafter with water and then dried and evaporated. The residue is recrystallized from ethyl acetate-petroleum ether.

Rƒ in To:EtOH (8:2) = 0.27 on SiO₂.

(2) Removal protecting groups

The removal is performed in the same way as described in example I.2, but stirring takes place with 90% trifluoro acetic acid for 1 hour.

Rƒ in Bu:Py:Ac:Wa (4:3/4:1/4:1) = 0.19 on SiO₂.

(3) In the same manner are prepared:

| | | Rƒ in Bu:Py:Ac:Wa (4:3/4:1/4:1) |
|---|---|---|
| H-D-Met-Glu-His-Phe-D-Lys-OH | Starting from B.2 and K.2 | 0.18 |
| H-β-Ala-Glu-His-Phe-D-Lys-OH | Starting from D.2 and K.2 | 0.16 |
| H-Val-Glu-His-Phe-D-Lys-OH | Starting from C.2 and K.2 | 0.18 |
| Desamino-Met-Glu-His-Phe-D-Lys-OH | Starting from F.3 and K.2 | 0.26 |
| H-Met-Gln-His-Phe-D-Lys-OH | Starting from G and K.2 | 0.25 |

EXAMPLE III

A-Glu-His-Phe-Lys-Trp-Y (1) Boc-Ala-Glue(OtBu)-His-Phe-D-Lys(Boc)-Trp-OH

Starting from 1.05 g. (2 mmol) of Boc-Ala-Glu(OtBu)-His-N₂H₃ (F.1) the azide is prepared by the process described in Example II.1. This azide is added to 1.23 g. of H-Phe-D-Lys(Boc)-Trp-OH.HCl (Example L.2) dissolved in 10 ml. of DMF, after which the final pH is adjusted with TAA to 7.3. The reaction mixture is stirred for 70 hours, after which it is evaporated to dryness and the residue stirred with aqueous ethylacetate. The ethyl acetate is washed twice with water and then evaporated to dryness. The residue is recrystallized from alcohol-peroxide-free ether (1:1). Melting point: 173° dec.

Rƒ in Bz:EtOH (8:2) = 0.27 on SiO₂.

(2) Boc-Val-Glu(OtBu)-His-Phe-D-Lys(Boc)-Trp-NH₂

Starting from 1.11 g. of Boc-Val-Glu(OtBu)-His-N₂H₃ (C.2) and 1.22 g. of H-Phe-D-Lys(Boc)-Trp-NH₂.HCl (L.5.1.) the above mentioned peptide amide is obtained in the same way as described in 1. Pouring out of the reaction mixture into the tenfold quantity of water gives a precipitate. This precipitate is stirred with ethyl acetate-petroleum ether to obtain 1.3 g. of peptide.

Rƒ in Am:Py:Wa (5:3:2) = 0.84 on SiO₂.

(3) In the same way as described in 1 or 2 are obtained:

Boc-Ala-Glu(OtBu)-His-Phe-D-Lys(Boc)-Trp-OC₁₁H₂₃ (from F.1 and L.5.3.)
Boc-Val-Glu(OtBu)-His-Phe-D-Lys(Boc)-Trp-OH from (C.2 and L.2)
Boc-Val-Glu(OtBu)-His-Phe-D-Lys(Boc)-Trp-N(CH₃)₂ (from C.2 and L.5.2.)
Boc-Val-Glu(OtBu)-His-Phe-D-Ls(Boc)-Trp-OC₁₁H₂₃ (from C.2 and L.5.3.)
Boc-Met-Glu(OtBu)-His-Phe-D-Ls(Boc)-Trp-OH (from A.2 and L.2)
Desamino-Met-Blu(OtBu)-His-Phe-D-Lys(Boc)-Trp-OH (from F.3 and L.2).

(4) Removal protecting groups

One hours' treatment of the peptides mentioned in 1, 2 and 3 in 90% trifluoro acetic acid as described in example I.2 yields the hexapeptides as the acetates:

|  | Rf[1] |
|---|---|
| H-Ala-Glu-His-Phe-D-Lys-Trp-OH | 0.23 on $SiO_2$ |
| H-Val-Glu-His-Phe-D-Lys-Trp-$NH_2$ | 0.31 on $SiO_2$ |
| H-Ala-Glu-His-Phe-D-Lys-Trp-$OC_{11}H_{23}$ | 0.38 on $SiO_2$ |
| H-Val-Glu-His-Phe-D-Lys-Thp-OH | 0.26 on $SiO_2$ |
| H-Val-Glu-His-Phe-D-Lys-Trp-$N(CH_3)_2$ | 0.33 on $SiO_2$ |
| H-Val-Glu-His-Phe-D-Lys-Trp-$OC_{11}H_{23}$ | 0.40 on $SiO_2$ |
| H-Met-Glu-His-Phe-D-Lys-Trp-OH | 0.25 on $SiO_2$ |
| Desamino-Met-Glu-is-Phe-D-Lys-Trp-OH | 0.29 on $SiO_2$ |

[1] Rf in Bu:Py:Ac:Wa (4:3/4:1/4:1).

EXAMPLE IV

H-Gly-Glu-His-Phe-D-Arg-Tra (1) Boc-Gly-Glu(OtBu)-His-Phe-D-Arg-Tra

Two mmol of Boc-Glu(OtBu)-His-$N_2H_3$ (E.2) is converted into the azide by the process described in example I and coupled with 2 mmol of the peptide H-Phe-D-Arg-Tra.acetate (N.2) described before. The final pH is adjusted with TAA to 7.1. After 70 hours' stirring at 0° the DMF solution is diluted with ethyl acetate, and this phase is washed with water and a sodium bicarbonate solution (5%). The phase is washed again with water, after which the ethyl acetate is distilled off.

Rf in Bz:EtOH (8:2) .039 on $SiO_2$.

(2) Removal protecting groups

One gram of the substance is dissolved in 20 ml. of 90% TFA while heating gently, and further treated as described before (Example I.2). Before the removal of the Dowex by filtration the substance in heated gently.

Acetate of H-Gly-Glu-His-Phe-D-Arg-Tra

Rf in Bu:Py:Ac:Wa (4:3/4:1/4:1)=0.19 on $SiO_2$.

EXAMPLE V

A-Glu-His-Phe-D-Arg-Tra and A-Glu-His-Phe-D-Lys-Tra (1) Boc-Met-Glu(OtBu)-His-Phe-D-Arg-Tra Two mmol of H-Phe-D-Arg-Tra.acetate (N.2) are added to the azide prepared according to example I.1 and enough TAA to adjust the final pH to 7.2. The mixture is stirred for 70 hours, after which the reaction mixture is filtered and the filtrate evaporated to dryness. The residue is stirred three times with dry ethyl acetate, after which the residue is dissolved in alcohol and added dropwise to dry ethyl acetate to obtain a precipitate, which is filtered off.

Rf in Bz:EtOH (8:2)=0.25 on $SiO_2$.

(2) Boc-Met-Glu(OtBu)-His-Phe-D-Lys(Boc)-Tra

Two mmol of H-Phe-D-Lys(Boc)-Tra (M.2) are added to the azide obtained in example I.1, and enough TAA to obtain a final pH of 7.2. The reaction mixture is evaporated to dryness, after which it is passed into aqueous ethyl acetate in the course of doing so the peptide crystallizes out. After 3 hours' stirring at +5° C. filtration takes place. Yield: 1.2 g.

Rf in Bz:EtOH (8:)=0.37 on $SiO_2$.

In the same way: Boc-D-Met-Glu(OtBu)-His-Phe-D-Lys(Boc)-Tra, Boc-β-Ala-Glu(OtBu)-His-Phe-D-Lys(Boc)-Tra and Desamino-Met-Glu(OtBu)-His-Phe-D-Lys(Boc)-Tra are prepared.

(3) Removal of protecting groups in the peptides of 1 and 2

The above mentioned peptides are treated in the way described before. Before lyophilization, extra acetic acid is added to raise the solubility.

Obtained in this way the acetate of:

|  | Rf[1] |
|---|---|
| H-Met-Glu-His-Phe-D-Arg-Tra | 0.18 on $SiO_2$ |
| H-Met-Glu-His-Phe-D-Lys-Tra | 0.23 on $SiO_2$ |
| H-D-Met-Glu-His-Phe-D-Lys-Tra | 0.20 on $SiO_2$ |
| H-β-Ala-Glu-His-Phe-D-Lys-Tra | 0.19 on $SiO_2$ |
| Desamino-Met-Glu-His-Phe-D-Lys-Tra | 0.26. on $SiO_2$ |

[1] Rf in Bu:Py:Ac:Wa (4.3/4:1/4:1)

EXAMPLE VI

A-Glu-His-Phe-D-Arg-Trp-Gly-OH (1) Boc-Val-Glu(OtBu)-His-Phe-D-Arg-Trp-Gly-OH

Starting from Boc-Val-Glu(OtBu)-His-$N_2H_3$ (C.2) and the acetate of H-Phe-D-Arg-Trp-Gly-OH (0.4) the above-mentioned heptapeptide is prepared on a 2 mmol scale by the process described in example I. The mixture is stirred for 70 hours at 0° C., after which the reaction mixture is poured into water and stirred for another 3 hours. Then the precipitate is filtrate off.

Rf in Bu:Py:Ac:Wa (4:3/4:1/4:1)=0.57 on $SiO_2$.

(2) Removal of protecting groups

Treatment of this peptide as described in example I.2 gives the H-Val-Glu-His-Phe-D-Arg-Trp-Glu-OH.acetate.

Rf in Bu:Py:Ac:Wa (4:3/4:1/4:1)=0.21 on $SiO_2$.

(3) In the same way are prepared the acetate of:

|  | Rf (in Bu:Py:Ac:Wa—4:3/4:1/4:1) |
|---|---|
| H-Met-Glu-His-Phe-D-Arg-Trp-Gly-OH | 0.17 on $SiO_2$ |
| H-β-Ala-Glu-His-Phe-D-Arg-Trp-Gly-OH | 0.14 on $SiO_2$ |
| Desamino-Met-Glu-His-Phe-D-Arg-Trp-Gly-OH | 0.22 on $SiO_2$ |

EXAMPLE VII

A-Glu-His-Phe-D-Lys-Phe-OH (1) Boc-β-Ala-Glu(OtBu)-His-Phe-D-Lys(Boc)-Phe-OtBu

Four mmol of Boc-β-Ala-Glu(OtBu)-His-$N_2H_3$ (D.2) are dissolved in 25 ml. of DMF. This solution is cooled down to −5° C., after which 4 ml. of 3 N HCl/THF are added, and at −20° C. 0.55 ml. of isoamyl nitrite. The mixture is stirred for 7 minutes at −20° C., after which half of this azide solution is added to a solution of 1.2 g. of H-Phe-D-Lys(Boc)-Phe-OtBu (P.4) in 10 ml. of DMF, precooled to −1° C. The pH of them ixture is adjusted with TAA to 7.3, after which the reaction mixture is stirred at 0° for 71 hours, whereupon it is poured into water. Filtration of the resulting precipitate yields the crude peptide in 62% yield, which is recrystallized three times from ethyl acetate/petroleum ether.

Melting point: 193° dec.
Rf in To:EtOH (8:2)=0.51 on $SiO_2$.

(2) Treatment of the above-mentioned peptide by the process described in example I.2 gives the acetate of H-β-Ala-Glu-His-Phe-D-Lys-Phe-OH in 75% yield.

Rf in Bu:Py:Ac:Wa (4:3/4:1/4:1)=0.21 on SiO$_2$.

(3) In the same way are prepared the acetates of:

| Peptide | Rf | Starting products |
|---|---|---|
| H-Met-Glu-His-Phe-D-Lys-Phe-OH | [1] 0.38 | A.2 plus P.4 |
| H-Val-Glu-His-Phe-D-Lys-Phe-OH | [1] 0.35 | C.2 plus P.4 |
| Desamino-Met-Glu-His-Phe-D-Lys-Phe-OH | [2] 0.24 | F.3 plus P.4 |
| H-Met-Gln-His-Phe-D-Lys-Phe-OH | [1] 0.25 | G plus P.4 |

[1] Rf in Bu:Py:Ac:Wa (2:3/4:1/4:1) on SiO$_2$.
[2] Rf in Bu:Py:Ac:Wa (4:3/4:1/4:1) on SiO$_2$.

EXAMPLE VIII

H-β-Ala-Glu-His-Phe-D-Lys-Phe-Gly-OH (1) Boc-β-Ala-Glu(OtBu)-His-Phe-D-Lys(Boc)-Phe-Gly-OtBu

Starting from the (other half of the) azide solution prepared in example VII.1, the above-mentioned heptapeptide is obtained by condensation in the same way with 2 mmol H-Phe-D-Lys(Boc)-Phe-Gly-OtBu (Q.4) and isolated.

Rf in Bz:EtOH (8:2)=0.53 on SiO$_2$.

(2) Removal of protecting groups

Treatment of this peptide in the same way as described in example I.1 gives the acetate of:
H-β-Ala-Glu-His-Phe-D-Lys-Phe-Gly-OH Rf in Bu:Py:Ac:Wa (4:3/4:1/4:1)=0.19 on SiO$_2$.

(3) In the same manner are prepared the acetates of:

H - Met - Glu - His - Phe - D - Lys - Phe-Gly-OH _____ Rf[1]=0.28
H - (α - Me)Ala - Glu - His - Phe - D - Lys-Phe-Gly-OH _____ Rf[1]=0.26
Desamino - Met - Glu - His - Phe - D - Lys - Phe - Gly - OH _____ Rf[1]=0.31

[1] Rf in Bu:Py:Ac:Wa (2:3/4:1/4:1) on SiO$_2$.

EXAMPLE IX

H-(α-Me)Ala-Glu-His-Phe-D-Lys-phenylalkyl amides (1) Boc(α-Me)Ala-Glu(OtBu)-His-Phe-D-Lys(Boc)-PPA 0.96 g. of Boc-(α-Me)Ala - Glu(OtBu) - His-N$_2$H$_3$ (F.2) is dissolved in 10 ml. of DMF, after the hydrazide is converted into the azide with 3 ml. of 1 N HCl/THF and 0.13 ml. of isoamyl nitrite, in the conventional manner. This azide is added to 1 mmol of H-Phe-D-Lys(Boc)-PPA.HCl (prepared in R.4) after which the pH is adjusted with TAA to 7.3. The reaction mixture is stirred for 75 hours, after which it is evaporated and the residue stirred with water (three times). The insoluble part is further purified by dissolving it in ethyl acetate and pouring it into the same quantity of petroleum ether to precipitate the peptide again.

Rf in Bz:EtOH (8:2)=0.31 (SiO$_2$).

(2) Removal protecting groups

Treatment in trifluoro acetic acid as described in example I.2 yields the trifluoro acetate, which is converted by means of Dowex X-8 in the acetate form into the corresponding acetate H-(α-Me)Ala-Glu-His-Phe-D-Lys-PPA.

Rf in Bu:Py:Ac:Wa (2:3/4:1/4:1)=0.34 on SiO$_2$.

(3) In the same way are prepared the acetates of:

H-(α-Me)Ala-Glu-His-Phe-D-Lys-Amf __ Rf[1]=0.33
H-(α-Me)Ala-Glu-His-Phe-D-Lys-PEA __ Rf[1]=0.35
H-β-Ala-Glu-His-Phe-D-Lys-PPA _____ Rf[1]=0.30
Desamino-Met-Glu-His-Phe-D-Lys-Amf __ Rf[1]=0.45

[1] Rf in Bu:Py:Ac:Wa (2:3/4:1/4:1) on SiO$_2$.

EXAMPLE X

H-Met-Glu-His-Phe-D-Lys-phenylalkyl amides

In the same way as described in example IX are prepared by condensation of Boc-Met-Glu(OtBu)-His-N$_3$ (obtained by treating the hydrazide of A.2 with isoamylnitrite in the conventional manner) with one of the dipeptide-amide derivatives prepared in R.4 and R.5 followed by deprotection of the peptide obtained from them, the acetates of:

H-Met-Glu-His-Phe-D-Lys-PPA _____ Rf[1]=0.39
H-Met-Glu-His-Phe-D-Lys-PEA _____ Rf[1]=0.38
H-Met-Glu-His-Phe-D-Lys-Amf _____ Rf[1]=0.42
H-Met-Glu-His-Phe-D-Lys-HPEA _____ Rf[1]=0.35

[1] Rf in Bu:Py:Ac:Wa (2:3/4:1/4:1) on SiO$_2$.

EXAMPLE XI

Sulfones of Met- or Desamino-Met containing peptides (1) Of the peptide H-Met-Glu-His-Phe-D-Lys-Phe-OH 175 mg. are dissolved in a mixture of 0.5 ml. of water, 0.1 ml. of 4 N perchloric acid, 0.02 ml. of 0.5 M ammoniummolybdate, after which 0.06 ml. of 30% H$_2$O$_2$ is added. The mixture is stirred at a temperature of about 10° C. for 2 hours and then diluted with 25 ml. of t-butanol/water, after which Dowex in the acetate form is added. After 30 minutes' stirring the ion-exchanger is filtered off and the filtrate lyophilized to obtain H-Met(→O$_2$)-Glu-His-Phe-D-Lys-Phe-OH.

Rf in Bu:Ac:Wa (4:1:1)=0.25 on SiO$_2$.

(2) In the same manner the following sulfones are prepared:

| Peptides | Rf on SiO$_2$ (Bu:Ac:Wa 4:1:1) |
|---|---|
| H-Met(→O$_2$)-Glu-His-Phe-Lys-Gly-OH | 0.23 |
| H-Met(→O$_2$)-Glu-His-Phe-D-Lys-PPA | 0.32 |
| Desamino-Met(→O$_2$) - Glu - His - Phe-D-Lys-Phe-OH | 0.33 |
| Desamino - Met(→O$_2$) - Glu - His - Phe - D-Lys-Tra | 0.37 |
| Desamino - Met(→O$_2$) - Glu - His - Phe - D-Lys-Amf | 0.42 |
| Desamino - Met(→O$_2$) - Glu - His - Phe - D-Arg-Trp-Gly-OH | 0.27 |
| H-Met(→O$_2$)-Gln-His-Phe-D-Lys-Phe-OH | 0.29 |

EXAMPLE XII

Sulfoxides of Met- and Desamino-Met-peptides

Fifty milligrams of the peptide to be oxidized are dissolved in 5 ml. of acetic acid, after which 15 μl. of 30% hydrogen peroxide are added.

The mixture is stirred at 20° C. for one hour, after which a suspension of 40 mg. of platinum black in glacial acetic acid is added and the mixture is stirred for 30 minutes.

After filtration the acetic acid is distilled off in vacuum. The resulting residue is dissolved in a mixture of t-butanol/water (1:1) and then lyophilized.

In this way the following sulfoxides are obtained:

| Peptide | Rf on SiO$_2$ |
|---|---|
| H-Met(→O)-Glu-His-Phe-D-Arg-OH | 0.16 |
| H-Met(→O)Glu-His-Phe-D-Lys-OH | 0.20 |
| H-Met(→O)-Glu-His-Phe-D-Lys-Trp-OH | 0.19 |
| H - Met(→O) - Glu - His - Phe - D - Arg - Trp-Gly-OH | 0.17 |
| H-Met(→O)-Glu-His-Phe-D-Lys-Phe-OH | 0.19 |
| H-Met(→O)-Glu-His-Phe-D-Lys-PPA | 0.24 |
| H-Met(→O)-Glu-His-Phe-D-Lys-Tra | 0.17 |
| Desamino - Met(→O) - Glu - His - Phe - D-Lys-Phe-OH | 0.23 |
| Desamino - Met(→O) - Glu - His - Phe - D-Lys - Tra | 0.22 |
| Desamino - Met(→O) - Glu - His - Phe - D-Lys -PPA | 0.26 |

[4] Rf in Bu:Py:Ac:Wa (4:3/4:1/4: 1).

EXAMPLE XIII

Preparation of H-Met(1,→0)-Glu-His-Phe-D-Lys-Phe-OH

Boc-L-Met(1,→0)-OH is prepared by reacting Boc-azide with H-L-Met(1,→0)-OH, described in J. Biol. Chem. 169, 477 (1947). Boc-L-Met(1,→0)-OH: m.p. 68° C.; $[\alpha]_D^{20} = -58°$ (c.=1, DMF). This N-protected amino acid is converted into the corresponding N-hydroxy-succinimido ester by treatment with DCCI and HOSu. The active ester obtained is used at once for a coupling reaction with H-Glu(OtBu)-His-Phe-D-Lys(Boc)-Phe-OH (obtained by the condensation) of Z-Glu(OtBu)-His-azide with H-Phe-D-Lys(Boc)-Phe-OH followed by hydrogenation of the Z-moiety) in the presence of N-ethylmorpholine. The resulting peptide derivative: Boc - L-Met(1,→O) - Glu(OtBu) - His-Phe-D-Lys(Boc)-Phe-OH, Rf in Bu:Ac:Wa (4:1:1)=0.45 on SiO₂, is deprotected in the manner described before by means of TFA and converted into the acetate: H-L-Met(1,→O)-Glu-His-Phe-D-Lys-Phe-OH.acetate: Rf in Bu:Py:Ac:Wa (2:3/4:1/4:1)=0.23.

In the same manner the peptide-sulfoxide H-L-Met(d,→O)-Glu-His-Phe-D-Lys-Phe-OH.acetate is prepared starting from Boc-L-Met(d,→O)-OH, m.p. 135° C.

EXAMPLE XIV

ZINC COMPLEXES

Of a solution of zinc chloride containing 50 mg. of zinc per ml., 1.5 ml. are added to a solution of 31.5 mg. of Na₂HPO₄.2H₂O in 30 ml. of distilled water. The precipitate of zinc phosphate formed is dissolved again by adding g N HCl. Then 175 mg. of NaCl and 0.5 g. of benzyl alcohol are added to this mixture. After that 1.5 mg. of the hexapeptide H-L-Met-L-Glu-L-His-L-Phe-D-Lys-L-Phe-OH are dissolved in this mixture, whereupon enough 1 N sodium hydroxide is added to adjust the pH of the mixture of 8.5. After that the volume is completed to 50 ml. with distilled water.

One millilitre of suspension contains:

30 μg. of hexapeptide
1.5 mg. of zinc
0.63 mg. of Na₂HPO₄.2H₂O
3.5 mg. of NaCl
10 mg. of benzyl alcohol.

What is claimed is:
1. A peptide of the formula:

A-L-Glu(X)-L-His-L-Phe-Q-Y in which A is selected from the group consisting of H-L-Met, H-D-Met, H-L-Met (→O), H-D-Met (→O), H-L-Met (→O₂), H-D-Met (→O₂), desamino-Met, desamino-Met (→O), desamino-Met (→O₂), and the moiety: H₂N-B-CO-, in which B is alkylene having 1-6 carbon atoms, X is selected from the group consisting of OH and NH₂, Q is selected from the group consisting of D-Lys and D-Arg, and Y is selected from the group consisting of OH, L-Trp-OH, L-Phe-OH, L-Trp-Gly-OH, L-Phe-Gly-OH, (N-phenyl-alkyl)-amino of the formula

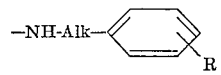

and a (N-β-indolylalkyl) amino moiety of the formula

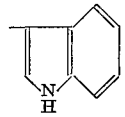

in which Alk is alkylene with 1-6 carbon atoms, and R is selected from the group consisting of hydrogen and hydroxy, and functional derivatives of said peptide selected from the group consisting of pharmaceutically acceptable acid addition salts, derivatives in which one or more free amino groups are substituted by acyl derived from an aliphatic carboxylic acid with 1-6 carbon atoms, unsubstituted amides or lower alkyl (1-6 C) substituted amides of those peptides having a free carboxyl group, esters derived from aliphatic or araliphatic alcohols with 1-8 carbon atoms, and metal complexes thereof.

2. A peptide according to claim 1 of the formula:

A-L-Glu(X)-L-His-L-Phe-Q-Phe-OH in which A, X and Q have the meanings indicated in claim 1.

3. A peptide according to claim 1 of the formula:

A-L-Glu(X)-L-His-L-Phe-Q-Tra in which A, X and Q have the meanings indicated in claim 1, wherein Tra is the (N-β-indolylethyl) amine group.

4. A peptide according to claim 1 in which A is selected from the group consisting of H-L-Met, H-L-Met(→O), H-L-Met(→O₂), desamino-Met, desamino-Met(→O), desamino-Met(→O₂) and β-Ala.

5. Metal complexes of the peptides and peptide derivatives as claimed in claim 1.

References Cited

UNITED STATES PATENTS

| | | | |
|---|---|---|---|
| 3,479,333 | 11/1969 | Greven | 260—112.5 |
| 3,632,743 | 1/1972 | Geller et al. | 260—112.5 |
| 3,228,927 | 1/1966 | Kappeler et al. | 260—112.5 |

LEWIS GOTTS, Primary Examiner

R. J. SUYAT, Assistant Examiner

U.S. Cl. X.R.
424—177